United States Patent
Treat et al.

(10) Patent No.: US 10,721,217 B2
(45) Date of Patent: Jul. 21, 2020

(54) CRYPTOGRAPHIC DATASHARE CONTROL FOR BLOCKCHAIN

(71) Applicant: Accenture Global Solutions Limited, Dublin (IE)

(72) Inventors: David Treat, Ridgefield, CT (US); John Velissarios, London (GB); Teresa Sheausan Tung, Tustin, CA (US); Luiz Pizzato, Melrose Park (AU); Deborah Garand, Newfields, NH (US); Atieh Ranjbar Kermany, Macquarie Park (AU); Chia Jung Chang, Sunnybank Hills (AU); Arjun Sitaraman Krishnan, Seattle, WA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/672,761

(22) Filed: Nov. 4, 2019

(65) Prior Publication Data
US 2020/0153803 A1 May 14, 2020

Related U.S. Application Data

(60) Provisional application No. 62/757,273, filed on Nov. 8, 2018.

(51) Int. Cl.
*H04L 29/06* (2006.01)
*H04L 9/00* (2006.01)
(Continued)

(52) U.S. Cl.
CPC .......... *H04L 63/0442* (2013.01); *H04L 9/008* (2013.01); *H04L 9/0637* (2013.01); *H04L 9/3073* (2013.01); *H04L 2209/38* (2013.01)

(58) Field of Classification Search
None
See application file for complete search history.

(56) References Cited

U.S. PATENT DOCUMENTS

| 8,495,714 | B2 | 7/2013 | Jones et al. |
| 2007/0113269 | A1 | 5/2007 | Zhang |

(Continued)

FOREIGN PATENT DOCUMENTS

EP 3 576 033 A1 12/2019

OTHER PUBLICATIONS

Extended European Search Report for EP Application No. 19 207 482.1, dated Mar. 16, 2020, 10 pgs.
(Continued)

*Primary Examiner* — Benjamin E Lanier
(74) *Attorney, Agent, or Firm* — Brinks Gilson & Lione

(57) ABSTRACT

A system includes circuitry for cryptographic data share controls for distributed ledger technology based data constructs. The system may support placement of compute data on to a distributed ledger technology based data construct. The compute data may have multiple layers of encryption to support permissions and coordination of processing operations for application to the compute data. The multiple layers of encryption may include a homomorphic layer to allow sharing of the compute data for processing by a compute party without divulging the content of the compute data with the compute party. While in the homomorphically encrypted form, the homomorphic compute data supports the application of processing operations while maintaining the secrecy of the underlying data.

20 Claims, 6 Drawing Sheets

(51) Int. Cl.
*H04L 9/06* (2006.01)
*H04L 9/30* (2006.01)

(56) References Cited

U.S. PATENT DOCUMENTS

| | | |
|---|---|---|
| 2013/0086670 A1 | 4/2013 | Vangpat |
| 2013/0198383 A1 | 8/2013 | Tseng et al. |
| 2014/0130139 A1 | 5/2014 | Lee |
| 2019/0251553 A1* | 8/2019 | Ma .................. H04L 9/3247 |
| 2019/0281066 A1* | 9/2019 | Simons ............. H04L 9/0618 |

OTHER PUBLICATIONS

Mendis, Gihan et al., "Blockchain as a Service: A Decentralized and Secure Computing Paradigm", Dept. of Computer and Information Technology, Purdue University, Jul. 2018, 14 pgs.

* cited by examiner

200 

| Select underlying compute data for provision to DLT-based data construct. | 202 |

| Encrypt the underlying compute data using a homomorphic encryption scheme. | 204 |

| Permissions encrypt the homomorphic compute data. | 206 |

| Cause the secured homomorphic compute data to be added to the DLT-based data construct. | 208 |

| Authorize the compute party to access to the homomorphic compute data. | 210 |

Figure 2

CRYPTOGRAPHIC DATASHARE CONTROL FOR BLOCKCHAIN

PRIORITY

This application claims priority to U.S. Provisional Patent Application No. 62/757,273, filed 8 Nov. 2018, which is incorporated herein in its entirety.

TECHNICAL FIELD

This disclosure relates to controlled datasharing in distributed network environments.

BACKGROUND

Rapid advances in electronics and communication technologies, driven by immense customer demand, have resulted in the widespread adoption of electronic transactions, record keeping, and data sharing. As one example, e-currencies, such as Bitcoin, have displaced paper currencies in millions of transactions per year. Improvements in tracking and/or knowledge management attached to such electronic transactions will continue to increase the features and options available to operators engaging in electronic transactions.

BRIEF DESCRIPTION OF THE DRAWINGS

FIG. 2 shows example controlled datashare logic

DETAILED DESCRIPTION

Figure 1:
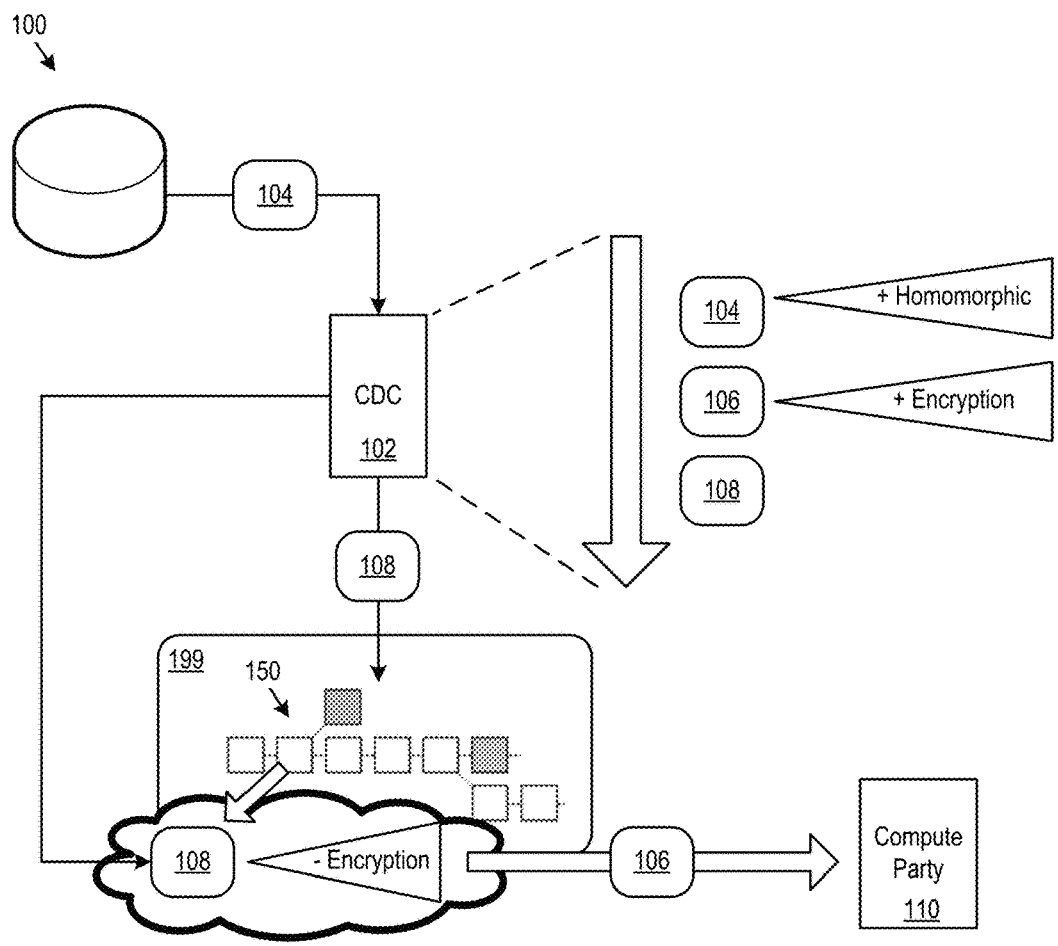
FIG. 1 shows an example controlled datashare environment.

A blockchain may include a series of data blocks, the blocks including a code, such as a cryptographic hash or checksum, which may be coding-consistent with the content of previous blocks in the series. In some cases, determining multiple different sets of blocks that produce the same integrity code may be insoluble, prohibitively computationally complex, or otherwise effort intensive enough to frustrate attempts to tamper with the contents of the blockchain while maintaining the self-consistence of the integrity codes. Further, content within the blockchain may be encrypted to control access to selected information stored on the blockchain.

In various systems, controls may be implemented for blockchain based shared data. In various cases, the controls may allow the participants to control 'what' information may be shared with 'whom', and/or 'when', and/or for 'how long'.

In some real world scenarios, such as processor design, information share may be desirable to increase efficiencies and technical accuracy in chip design and manufacture. However, without data sharing controls, sharing may be infeasible. The ability to audit, and control data element level shared access may increase the feasibility of data sharing arrangements and reduce costs/inefficiencies borne as a result of uncontrolled sharing.

In various implementations, blockchain data sharing control may be implemented by applying homomorphic encryption (e.g., a cryptologic technique) to content within the blockchain. The homomorphic encryption may allow sharing of selected data, data details, metadata, and/or other data features without necessarily sharing underlying data from which such selected data features may be derived or later recreated. The underlying compute data may refer to data in a decrypted/unencrypted form on which calculations or other analysis may be performed. For example, underlying compute data may include empirical data, test data, survey data, collected data, historical utilization data, sales data environmental data, industrial data, fabrication specifications, or other data on which analyses may be performed. The underlying blockchain allows participants to verify (e.g., in a trustless or less-than-full trust environment) that the various participants are working from the same underlying data and accordingly working with valid data features.

Homomorphic encryption schemes include a class of multiple different encryption schemes. Homomorphic encryption schemes use a homomorphic property of certain encryption algorithms, e.g., $H_m(x)$, where $H_m$ designates a homomorphic encryption algorithm. The homomorphic property provides that the sum of encrypted values is equal to the value of the encrypted sum of the values, e.g., $H_m(x)+H_m(y)=H_m(x+y)$. This homomorphic property may be used to disclose various features of the underlying data values, e.g., x and y, without disclosing x and y, using various known mathematical results from the homomorphic property. Further, because addition (e.g., an ADD operation) and multiplication (e.g., a MULT operation) may be performed on the encrypted data without decryption, processing operations, such as mathematical or modeling operations, may be performed on the data while in an encrypted state. Similarly, subtraction operations may be performed (e.g., inverse additions because: $H_m(x+y)+-H_m(y)=H_m(x)$). Accordingly, insights may be gleaned from the aggregate data without disclosing underlying values.

In some systems, multiple participants may put encrypted information into a shared data construct (e.g., based on a distributed ledger) with another specific participant to enable a designated party to run machine learning/AI or other data analytics in encrypted form. Each party may keep their data secret and the insight generator keeps their algorithm/insight capability secret. Results of the analysis could be shared with any combination of single participant, multiple participants, or all participants.

In a real-world data sharing scenario for silicon nanofabrication, each fabricator of a component shares encrypted data about a specific attribute of the process (heat, compound, recipe, or other attribute) and designated evaluator (such as an original equipment manufacturer (OEM)), analyses relative performance to identify which quality of the attribute yields the best result. The designated evaluator may not necessarily share the details about how the designated evaluator calculated the yield or what the yield was, but is able to provide a performance indication to individual or multiple fabricators. The fabricators have not necessarily shared the unencrypted value of the specific attribute. Accordingly, the fabricators data may not necessarily be in a re-shareable or later readable form. In a test-and-learn process and multiple interactions, fabricators can gain insight about attribute specific improvements and the OEMs can protect their yield/outcome information while getting better results. Information may be protected while cooperating to improve outcomes individually or as a group.

In some systems, multiple participants may put encrypted information into a shared data construct and one or more participants (in some cases, including participants that do not contribute to the shared data construct) are enabled to run their own analyses on the encrypted data. Each insight generator may keep their results private or share with the group. Each insight generator may not necessarily know who contributed 'what' data, nor may the insight generator necessarily know the specific values of the encrypted data.

In various systems, multiple parties may use a DLT-based file or ledger to maintain a tamper-evident record of events, transactions, or other updates. In some cases, a blockchain may register tampering after a change made to the blockchain. Thus, the parties may individually verify that updates by other parties are valid and coding-consistent with the previous data blocks of the blockchain. The self-consistence of the integrity codes allows the updates to the blockchain to be verified even if the party lacks an archived version of the blockchain to use as a reference.

In various systems, blockchains, and more generally distributed ledger technologies (DLTs), provide a platform for multiple parties share access to data with the ability to verify the validity and integrity of that data. Homomorphic encryption provides the ability for multiple parties to share data and perform computations on encrypted data without decrypting the data. The homomorphic encryption may be asymmetric allowing a second party to homomorphically encrypt data in a fashion that allows a first party to later control access permissions Applying homomorphic encryption to DLT content in a shared data system allows for the sensitive/secret/private information to be used collectively without dissemination of the sensitive/secret/private underlying data. Thus, using the technical architectures and techniques discuss, divulging data may not necessarily be a prerequisite to collaborative analysis of the data.

FIG. 1 shows an example controlled datashare environment (CDE) 100. In the CDE 100, controlled datashare circuitry CDC 102 may obtain underlying compute data 104, homomorphically encrypt the underlying compute data to generate homomorphic compute data 106. The CDC may encrypt the homomorphic compute data 106 with a second encryption layer to add permissions controls to generate secured homomorphic compute data 108. The CDC 102 may then cause the secured homomorphic compute data 108 to be passed to a distributed network 199 for inclusion on a DLT-based data construct 150. The compute party 110 may access the secured homomorphic compute data through the DLT-based data construct 150 with permission from the CDC. In some cases, the CDC 102 may authorize access to the homomorphic compute data 106 by decrypting one or more encryption layers above the homomorphic layer. The compute party may respond with homomorphic processed data, which the CDC 102 may decrypt and analyze and/or re-share.

FIG. 2 shows example controlled datashare logic (CDL) 200, which may execute on the CDC 102 and govern the operation of the CDC 102. The CDL 200 may select underlying compute data for provision to the DLT-based data construct (202).

In various implementations, the underlying compute data 104 may be selected based on input identifying (or providing) the data from an originator party. For example, the originator party may include a data-owner party that may have access to the underlying compute data in an unencrypted form. Additionally or alternatively, the originator party may include a stakeholder in the processing of the data. Additionally or alternatively, the underlying compute data may be selected based on various analytic selection criteria, selection rules, or other selection heuristics.

In some cases, the underlying compute data 104 may include data of various types for which processing may be implemented. For example, the data may include processor specifications, technical performance data, survey data, client data, consumer data, social media data, proprietary data, or other data types. In some cases, the underlying data may itself be homomorphically encrypted (e.g., when the originator party does not have access to unencrypted data but still acts as the first stage provider to the system. Multiple layers of homomorphic encryption may still allow for mathematical processing).

In various implementations, the DLT-based data construct 150 may include a distributed ledger (e.g., blockchain and/or blockchain-like technologies, 'blockchain' is used for convenience of terminology although other non-blockchain distributed ledgers may be used). The DLT-based data construct 150 may act as a medium for data exchange and coordination among the parties. The DLT-based data construct 150 may ensure that parties operate on consistent data without manipulation or changes among parties. Further, where multiple instances of the DLT-based data construct are used, the CDL 200 may verify the consistent data is used across the multiple instances.

The CDL 200 may encrypt the underlying compute data 104 using a homomorphic encryption scheme to generate homomorphic compute data 106 (204). The homomorphic compute data may include the underlying compute data 104 in an encrypted form that allows for processing operations to be performed on the underlying compute data, without necessarily requiring that the underlying compute data be decrypted (and thus divulged) at the time of processing (e.g., concurrent with processing). The underlying compute data may be later divulged or continue to be withheld indefinitely—operation on the homomorphic compute data does not necessarily preclude a party from being later given access to the underlying compute data.

The CDL 200 may determine a compute party. For example, the CDL 200 may access a pre-determined selection to determine the compute party. In some cases, the CDL 200 may determine the compute party based on various characteristics of parties participating in the distributed network. In some cases, actions of parties may allow for a determination of the compute party. For example, the compute party may include a party that forwards a request to be designated the compute party.

The CDL 200 may permissions encrypt the homomorphic compute data using a public key associated with the originator party to generate secured homomorphic compute data (206). Permissions encryption may ensure that access to the homomorphic compute data is circumscribed such that the originator party has control of the homomorphic compute data while other parties (e.g., those without access to/control of the private key) may necessarily not have access. The private key may correspond to the counterpart of the public key such that the private and public keys form an asymmetrical key pair. For example, where a public key is used for encryption a private key may be used for decryption (but the public key may not be used for decryption).

In various implementations, because the permissions encryption and the homomorphic encryption may be removed by the party controlling the corresponding private keys, access to encrypted data stored on the DLT-based data construct may be controlled through 'per access' authorization. For example, a party desiring to access encrypted data through the DLT-based data construct may (in some cases)

need to request that a private key holder remove that encryption (whether homomorphic or permissions encryption) each time the party wishes to access the encrypted data via the DLT-based data construct. Therefore, permission to access that the encrypted data via the DLT-based data construct may be revoked by failure of parties controlling the corresponding private keys to remove the encryption. In some cases, service agreements may prevent parties from storing data from the DLT-based data construct off-chain or in an unencrypted form (e.g., to defeat access revocation attempts)

In some cases, this asymmetric homomorphic encryption may operate to allow the CDL 200 to pass control of homomorphic compute data to a second party. For example, a compute party may add secondary data to be processed with the underlying compute data. The secondary data may also be homomorphically encrypted. To maintain computational consistency, the homomorphic encryption that may be used may be the same as that of the homomorphic compute data. Accordingly, using the homomorphic public key of the originator party, the compute party may homomorphically encrypt the secondary data. The compute party may, in some cases, not necessarily be able to decrypt the secondary data after applying such encryption (unless the compute party has access to the originator party's homomorphic private key).

The CDL 200 may permissions encrypt the homomorphic compute data using one or more of a variety asymmetric encryption schemes, such as elliptic curve encryption (ECC) or other asymmetric encryption schemes.

In some cases, multiple layers of asymmetric encryption may be used on top of the homomorphic encryption. This may be used to facilitate access control through coordination of multiple parties by ensuring that each of the multiple parties have permissions control in gaining access to the homomorphic compute data. Further, even in the absence of multiple asymmetric layers the use of both homomorphic encryption and permissions encryption may ensure that one or more parties with control of at least two secret keys party provide authorization (e.g., by decrypting the data with their private permissions key and private homomorphic key, respectively) before the underlying compute data 104 can be accessed using the form that is recorded and/or stored on the DLT-based data construct 150. Either party may incidentally have access to the underlying compute data. For example in some cases, the compute party may be a data owner and have access to the underlying compute data or secondary data through locally stored (off-chain) versions. Nevertheless, the accessing the underlying compute data from the secured homomorphic data stored/recorded on the DLT-based data construct compels the use of both the homomorphic private key and the permissions private key. If additional layers of encryption are present, additional keys may be compulsory for decryption of the underlying compute data.

The CDL 200 may cause the secured homomorphic compute data to be added to a current block of the DLT-based data construct (208). This may effect a controlled-share of the homomorphic compute data. In various implementations, the addition of the secured homomorphic compute data to the current block includes generation of a previous hash of a previous block, placement of the secured homomorphic compute data and the previous hash in the current block, and addition of the current block to the DLT-based data construct. In some cases, the CDL 200 may cause the secured homomorphic compute data to be added to the current block by generating a request to add the secured homomorphic compute data to the DLT-based data construct and sending the request to a participating node for the DLT-based data construct. In some cases, the CDL 200 may be executing on a participating node which may perform a portion (or all) of the tasks making up the addition of the secured homomorphic compute data to the current block. The participating nodes may be part of a distributed network supporting the DLT-based data construct.

The CDL 200 may authorize a compute party to perform one or more processing operations on the homomorphic compute data, by removing the permissions encryption layer and providing the homomorphic compute data to the compute party (210). The CDL 200 may access the secured homomorphic compute data from the DLT-based data construct.

The CDL 200 may receive homomorphic processed data in response to adding the secured homomorphic compute data to the DLT-based data construct and providing permission to the compute party. The homomorphic processed data may be generated by (or on behalf of) the compute party by applying the one or more processing operations to the homomorphic compute data. After application of the one or more processing operations, the homomorphic processed data remains in the homomorphically encrypted state. Accordingly, the compute party need not necessarily direct re-encryption of the homomorphic processed data after application of one or more processing operations. To access the homomorphic compute data, the compute party request permission from originator party.

In some cases, after processing the homomorphic compute data, the compute party may permissions encrypt the homomorphic processed data with its own permissions public key. This may prevent the originator party from being able to access the underlying processed data without permission from the compute party.

After providing permission in one instance, the data on the DLT-based data construct is still stored in the secured form. Accordingly, a party given permission to access data at one time cannot necessarily access the same data from the DLT-based data construct at a later time. Each access from the DLT-based data construct may compel a new permissions request from the originator party.

The CDL 200 may decrypt the homomorphic processed data using decryption parameters (such as techniques, keys, states, or other parameters) identical to those that would successfully decrypt the homomorphic compute data before the one or more processing operations where applied. Decrypting the homomorphic processed data may yield underlying processed data.

The CDL 200 may authorize access the underlying processed data by removing the homomorphic encryption on the homomorphic processed data and providing the underlying processed data to a target party. In some cases, where the compute party permission encrypts the homomorphic processed data, the CDL may coordinate with the compute party to provide a controlled share to a target party.

Additionally or alternatively, the CDL 200 may re-share the homomorphic processed data with a second compute party, where serial processing is used. In some cases, the homomorphic processed data may be passed directly from a first compute party to the second. Accordingly, other compute parties' nodes may access the homomorphic processed data to perform processing operations.

Figure 3:
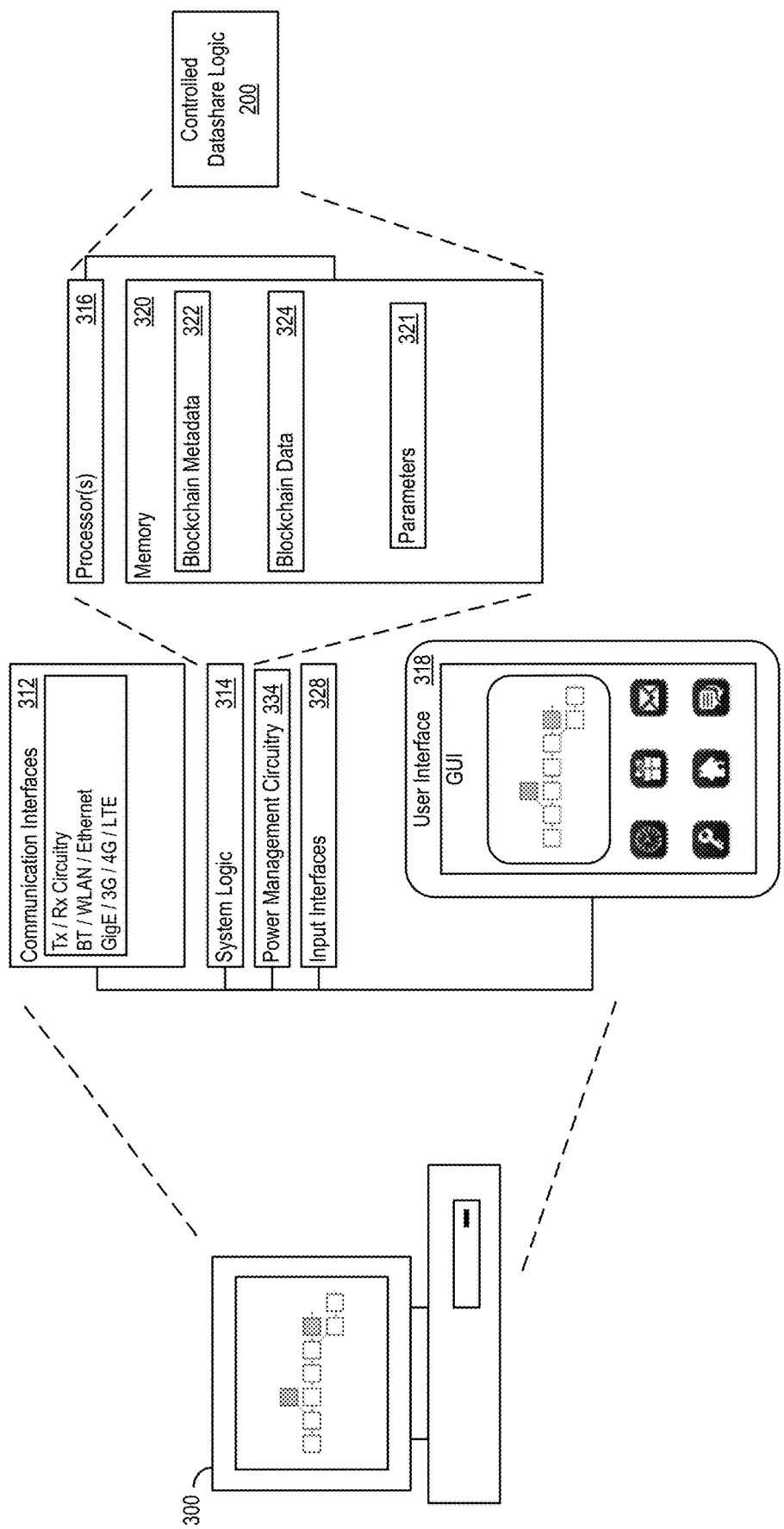
FIG. 3 shows an example datashare control system.

FIG. 3 shows an example datashare control system (DCS) 300, which may provide an execution environment for implementing datashare controls and/or manipulation of shared data while in an encrypted form. The DCS 300 may be used by, for example, a party sharing data on a blockchain and or performing processing on shared data on a block. The DCS 300 may include system logic 314 to support homomorphic encryption and decryption; generation of encryption parameters; manipulation of encrypted data (e.g., processing to glean derived insights); designating data for sharing; and/or other datashare control actions. The system logic 314 may include processors 316, memory 320, and/or other circuitry, which may be used to implement the CDL 200 thereby acting as the CDC 102.

The memory 320 may be used to store blockchain metadata 322 and/or blockchain data 324 used in datashare controls. The memory 320 may further store encryption parameters 321, such as an encryption key value, homomorphic parameters, such as, in an example homomorphic encryption scheme, axes values for an elliptic curve, or other secret value, that may facilitate sharing and manipulation of data.

The memory 320 may further include applications and structures, for example, coded objects, templates, or one or more other data structures to support datashare controls. The DCS 300 may also include one or more communication interfaces 312, which may support wireless, e.g. Bluetooth, Wi-Fi, WLAN, cellular (3G, 4G, LTE/A), and/or wired, ethernet, Gigabit ethernet, optical networking protocols. The communication interface 312 may support communication with other parties contributing or processing shared data. Additionally or alternatively, the communication interface 312 may support secure information exchanges, such as secure socket layer (SSL) or public-key encryption-based protocols for sending and receiving private data. The DCS 300 may include power management circuitry 334 and one or more input interfaces 328.

The DCS 300 may also include a user interface 318 that may include man-machine interfaces and/or graphical user interfaces (GUI). The GUI may be used to present data from DLT-based shares to an operator of the DCS 300. Additionally or alternatively, the user interface 318 may be used to datashare controls to an operator.

EXAMPLE IMPLEMENTATIONS

The following example implementations are described to be illustrative of various ones of the principles discussed above. However, the following examples are not intended to be limiting, but rather, in some cases, specific examples to aid in the illustration of the above described techniques and architectures. Various features of the following example implementations may be present in other implementations and absent in yet other implementations. The features of the following example implementations may be combined in various groupings in accord with the techniques and architecture described above.

Figure 4:
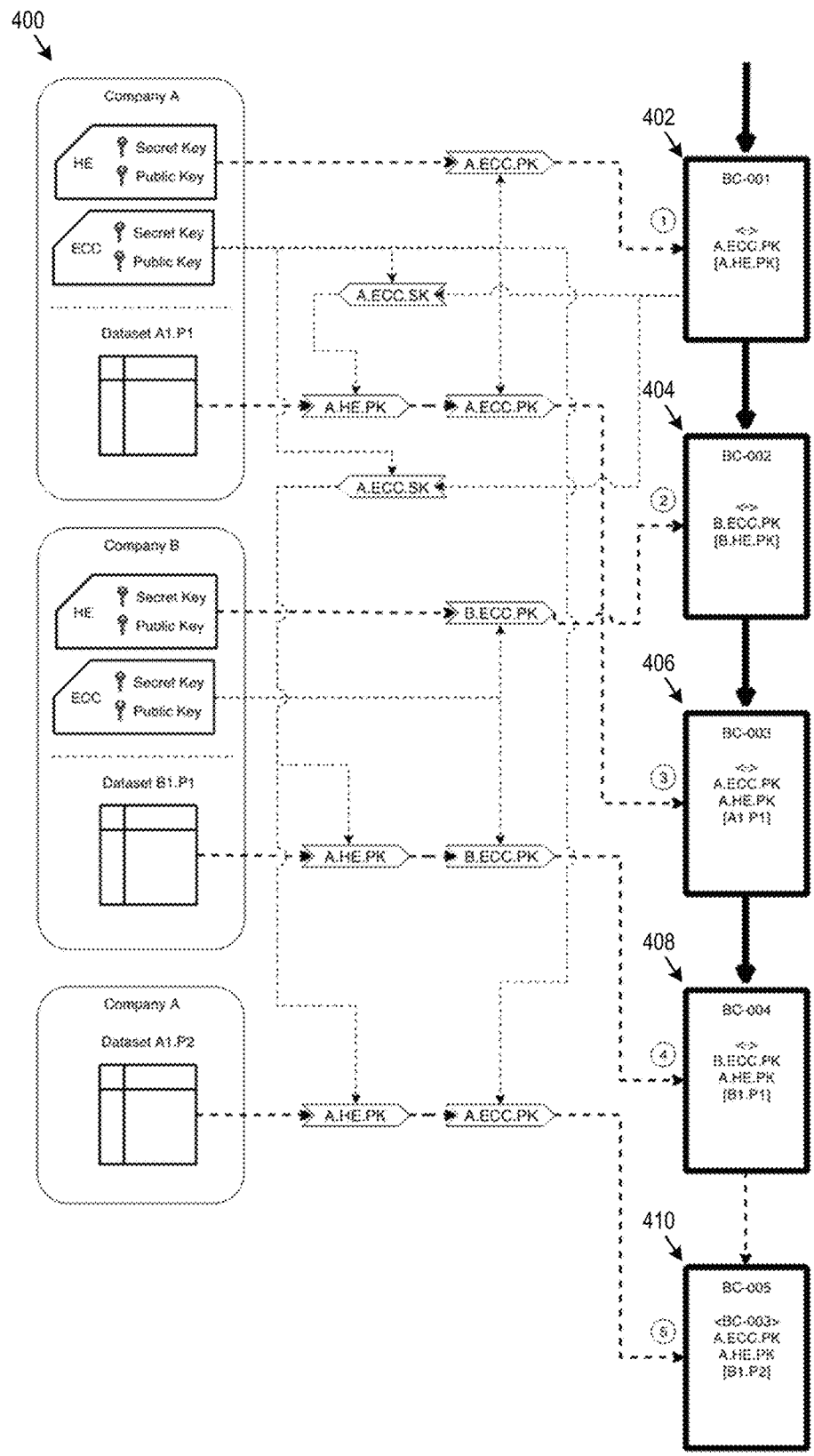
FIG. 4 shows an example system for writing data to a blockchain.

FIG. 4 shows an example system 400 for writing data to a blockchain (e.g., within a blockchain based construct). In the system, participating companies A and B generate two pairs of asymmetric encryption keys: a set of homomorphic encryption keys HE and a set of ECC encryption keys. Each set may include a public key (PK) and a private (secret) key (SK). Public keys may be stored within a blockchain. For example, A.HE.PK is stored in Block 001 402 and B.HE.PK is stored in Block 002 404. The HE public keys may be encrypted using the ECC public keys before storage in the blocks 402, 404 to ensure access to the HE public keys are constrained to those having permission from the respective companies. To add data to the blockchain, a participating company may encrypt data using both HE and ECC to determine the parties with access to the data and/or those able to perform processing operations. For example, Blocks 3 and 4 406, 408 include data encrypted using two both HE and ECC. Updates to data sets may be recorded in subsequent blocks. For example Block 005 410 includes an updated dataset from Block 004 408.

Figure 5:
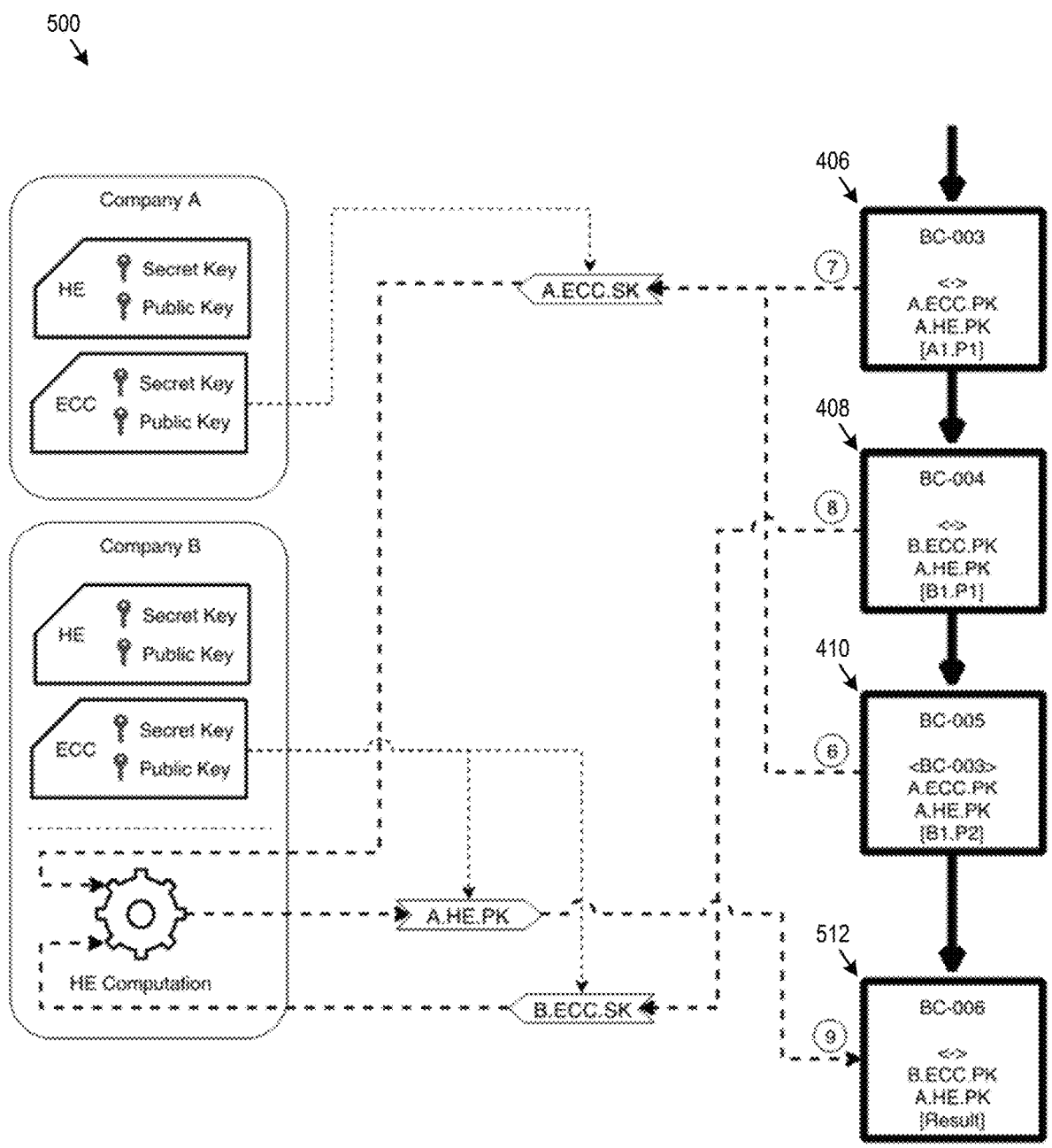
FIG. 5 shows an example system to support application of processing operations to homomorphically encrypted data.

FIG. 5 shows an example system 500 to support processing operations applied to homomorphically encrypted data. Company A, an originator party, provides compute data to Blocks 003 and 005 406, 410. Company A then removes the ECC layer and provides the compute data to Company B (e.g., provides authorization to Company B), for computations. Company B may also incorporate compute data for which it is the originator in the processing operations (e.g., the data in Block 004 408). The data supplied by Company B may also be homomorphically encrypted using the HE public key of A, such that all data used in the processing is consistently homomorphically encrypted. The processed data Block 006 512 may be ECC encrypted by Company B, such that the output may only be accessed with permissions from the compute party and the data originator.

Figure 6:
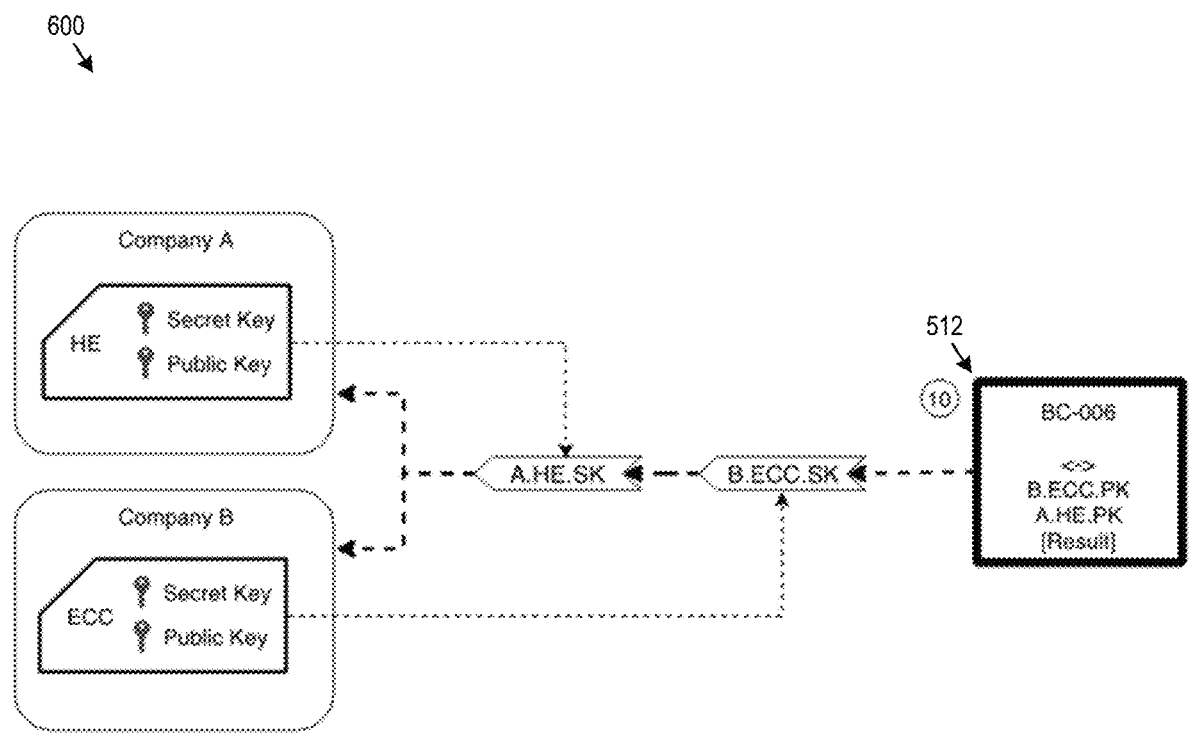
FIG. 6 shows an example system to support data sharing.

FIG. 6 shows an example system 600 to support data sharing. The data in Block 006 512 may be shared upon permission by Company B (through removal of the ECC layer) and Company A (through removal of the HE layer).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms.

Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations may use the techniques and architectures described above.

A1 In an example, a method includes: selecting underlying compute data for provision to a distributed ledger technology (DLT) based data construct; encrypting the underlying compute data, the underlying compute data encrypted in accord with a homomorphic encryption scheme, and the homomorphic encryption scheme to generate homomorphic compute data; determining a compute party associated with the DLT-based data construct, the compute party selected to cause performance of one or more processing operations on the homomorphic compute data, and the one or more processing operations performed without concurrent decrypted access to the underlying compute data; encrypting the homomorphic compute data with a public key, the public key associated with an originating party, and the public key to generate secured homomorphic compute data; causing the secured homomorphic compute data to be added to a current block of the DLT-based data construct, the adding to the current block of the DLT-based data construct to effect a controlled share of the homomorphic compute data with the compute party, and addition of the secured homomorphic compute data to the current block including: generation of a previous hash of a previous block; placement of the previous hash and the secured homomorphic compute data in the current block; and addition of the current block to the DLT-based data construct; and authorizing access, by the compute party, to the secured homomorphic compute data, the access authorized by decrypting the secured homomorphic compute data.

A2 The method of example A1, further including gleaning derived insights by decrypting the homomorphic compute data after machine learning is applied via the one or more processing operations.

A3 The method of either of examples A1 or A2, where the compute party is one of multiple parties that direct performance of processing operations on encrypted forms of the underlying compute data.

A4 The method of any of examples A1-A3, where decrypting the secured homomorphic compute data includes using a private key controlled by the originator party,
the private key including an asymmetrical pair to the public key.

A5 The method of any of examples A1-A4, where the compute party causes performance of the processing operations on the homomorphic compute data while encrypted using the homomorphic encryption scheme.

A6 The method of any of examples A1-A5, where the one or more processing operations include a multiplication operation (MULT), an addition operation (ADD), or a combination thereof.

A7 The method of any of examples A1-A6, where effecting the controlled share of the underlying compute data does not disclose underlying values within the underlying compute data to the compute party.

A8 The method of any of examples A1-A7, further including:
receiving homomorphic processed data, the homomorphic processed data generated by performing the one or more processing operations on the homomorphic computed data on behalf the compute party.

A9 The method of any of examples A1-A8, further including decrypting the homomorphic processed data using identical decryption parameters to those which would successfully decrypt the homomorphic compute data to access underlying processed data.

A10 The method of any of examples A1-A9, further including sharing the underlying processed data by coordinating authorization with the compute party.

A11 The method of any of examples A1-A10, further including effecting the sharing of the underlying processed data by appending the underlying processed data to the DLT-based data construct in a sharing block subsequent to the current block.

A12 The method of any of examples A1-A11, further including confirming that the underlying compute data is the same across multiple instances of the DLT-based data construct.

B1 In an example, a system includes: network interface circuitry configured to establish a communication link with a distributed network supporting a distributed ledger technology (DLT) based data construct; and controlled datashare circuitry configured to: select underlying compute data for provision to a distributed ledger technology (DLT) based data construct; encrypt the underlying compute data in accord with a homomorphic encryption scheme to generate homomorphic compute data; determine a compute party associated with the DLT-based data construct, the compute party selected to cause performance of one or more processing operations on the homomorphic compute data without concurrent decrypted access to the underlying compute data; encrypt the homomorphic compute data with a public key associated with an originating party to generate secured homomorphic compute data; cause the secured homomorphic compute data to be added to a current block of the DLT-based data construct to effect a controlled share of the homomorphic compute data with the compute party, addition of the secured homomorphic compute data to the current block including: generation of a previous hash of a previous block; placement of the previous hash and the secured homomorphic compute data in the current block; and addition of the current block to the DLT-based data construct; and authorize access, by the compute party, to the secured homomorphic compute data by decrypting the secured homomorphic compute data.

B2 The system of example B1, where the controlled datashare circuitry is further configured to glean derived insights by decrypting the homomorphic compute data after machine learning is applied via the one or more processing operations.

B3 The system of either of examples B1 or B2, where the compute party is one of multiple parties that direct performance of processing operations on encrypted forms of the underlying compute data.

B4 The system any of examples B1-B3, where the controlled datashare circuitry is configured to decrypt the secured homomorphic compute data includes using a private key controlled by the originator party, the private key including an asymmetrical pair to the public key.

B5 The system any of examples B1-B4, where the compute party causes performance of the processing operations on the homomorphic compute data while encrypted using the homomorphic encryption scheme.

B6 The system any of examples B1-B5, where the one or more processing operations include a multiplication operation (MULT), an addition operation (ADD), or a combination thereof.

B7 The system any of examples B1-B6, where the controlled datashare circuitry is configured to effect the controlled share of the underlying compute data without causing disclosure of underlying values within the underlying compute data to the compute party.

C1 In an example, a product includes: machine-readable media other than a transitory signal; instructions stored on the machine-readable media, the instructions configured to, when executed, cause a machine to: select underlying compute data for provision to a distributed ledger technology (DLT) based data construct; encrypt the underlying compute data in accord with a homomorphic encryption scheme to generate homomorphic compute data; determine a compute party associated with the DLT-based data construct, the compute party selected to cause performance of one or more processing operations on the homomorphic compute data without concurrent decrypted access to the underlying compute data; encrypt the homomorphic compute data with a public key associated with an originating party to generate secured homomorphic compute data; cause the secured homomorphic compute data to be added to a current block of the DLT-based data construct to effect a controlled share of the homomorphic compute data with the compute party, addition of the secured homomorphic compute data to the current block including: generation of a previous hash of a previous block; placement of the previous hash and the secured homomorphic compute data in the current block; and addition of the current block to the DLT-based data construct; and authorize access, by the compute party, to the secured homomorphic compute data by decrypting the secured homomorphic compute data.

D1 A system including circuitry configured to implement any of the methods of any of examples A1-A12.

E1 A product including instructions stored on a machine-readable medium, the instructions configured to cause a machine to implement any of the methods of any of examples A1-A12.

Various implementations have been specifically described. However, many other implementations are also possible.

Headings and/or subheadings used herein are intended only to aid the reader with understanding described implementations.

What is claimed is:

1. A method including:
    selecting underlying compute data for provision to a distributed ledger technology (DLT) based data construct;
    encrypting the underlying compute data to generate homomorphic compute data with a homomorphic layer of encryption,
        the underlying compute data encrypted in accord with a homomorphic encryption scheme;
    determining a compute party associated with the DLT-based data construct,
        the compute party selected to cause performance of one or more processing operations on the homomorphic compute data, and
        the one or more processing operations performed without concurrent decrypted access to the underlying compute data;
    encrypting the homomorphic compute data with a public key to generate secured homomorphic compute data by adding a secured layer of public key encryption above the homomorphic layer,
        the public key associated with an originating party;
    causing the secured homomorphic compute data to be added to a current block of the DLT-based data construct,
        the adding to the current block of the DLT-based data construct to effect a controlled share of the homomorphic compute data with the compute party, and
        addition of the secured homomorphic compute data to the current block including:
            generation of a previous hash of a previous block;
            placement of the previous hash and the secured homomorphic compute data in the current block; and
            addition of the current block to the DLT-based data construct; and
    authorizing access, by the compute party, to the homomorphic compute data to perform the one or more processing operations while the homomorphic compute data is still encrypted under the homomorphic layer of encryption,
        the access authorized by decrypting the secured homomorphic compute data to remove the secured layer.

2. The method of claim 1, further including gleaning derived insights by decrypting the homomorphic compute data after machine learning is applied via the one or more processing operations.

3. The method of claim 1, where the compute party is one of multiple parties that direct performance of processing operations on encrypted forms of the underlying compute data.

4. The method of claim 1, where decrypting the secured homomorphic compute data includes using a private key controlled by the originator party,
    the private key including an asymmetrical pair to the public key.

5. The method of claim 4, where the compute party causes performance of the processing operations on the homomorphic compute data while encrypted using the homomorphic encryption scheme.

6. The method of claim 1, where the one or more processing operations include a multiplication operation (MULT), an addition operation (ADD), or a combination thereof.

7. The method of claim 1, where effecting the controlled share of the underlying compute data does not disclose underlying values within the underlying compute data to the compute party.

8. The method of claim 1, further including:
    receiving homomorphic processed data, the homomorphic processed data generated by performing the one or more processing operations on the homomorphic computed data on behalf the compute party.

9. The method of claim 8, further including decrypting the homomorphic processed data using identical decryption parameters to those which would successfully decrypt the homomorphic compute data to access underlying processed data.

10. The method of claim 9, further including sharing the underlying processed data by coordinating authorization with the compute party.

11. The method of claim 10, further including effecting the sharing of the underlying processed data by appending the underlying processed data to the DLT-based data construct in a sharing block subsequent to the current block.

12. The method of claim 1, further including confirming that the underlying compute data is the same across multiple instances of the DLT-based data construct.

13. A system including:
network interface circuitry configured to establish a communication link with a distributed network supporting a distributed ledger technology (DLT) based data construct; and
controlled datashare circuitry configured to:
select underlying compute data for provision to a distributed ledger technology (DLT) based data construct;
encrypt the underlying compute data in accord with a homomorphic encryption scheme to generate homomorphic compute data with a homomorphic layer of encryption;
determine a compute party associated with the DLT-based data construct, the compute party selected to cause performance of one or more processing operations on the homomorphic compute data without concurrent decrypted access to the underlying compute data;
encrypt the homomorphic compute data with a public key associated with an originating party to generate secured homomorphic compute data by adding a secured layer of public key encryption above the homomorphic layer;
cause the secured homomorphic compute data to be added to a current block of the DLT-based data construct to effect a controlled share of the homomorphic compute data with the compute party, addition of the secured homomorphic compute data to the current block including:
generation of a previous hash of a previous block;
placement of the previous hash and the secured homomorphic compute data in the current block; and
addition of the current block to the DLT-based data construct; and
authorize access, by the compute party, to the homomorphic compute data to perform the one or more processing operations while the homomorphic compute data is still encrypted under the homomorphic layer of encryption by decrypting the secured homomorphic compute data to remove the secured layer.

14. The system claim 13, where the controlled datashare circuitry is further configured to glean derived insights by decrypting the homomorphic compute data after machine learning is applied via the one or more processing operations.

15. The system of claim 13, where the compute party is one of multiple parties that direct performance of processing operations on encrypted forms of the underlying compute data.

16. The system of claim 13, where the controlled datashare circuitry is configured to decrypt the secured homomorphic compute data includes using a private key controlled by the originator party,
the private key including an asymmetrical pair to the public key.

17. The system of claim 16, where the compute party causes performance of the processing operations on the homomorphic compute data while encrypted using the homomorphic encryption scheme.

18. The system of claim 13, where the one or more processing operations include a multiplication operation (MULT), an addition operation (ADD), or a combination thereof.

19. The system of claim 13, where the controlled datashare circuitry is configured to effect the controlled share of the underlying compute data without causing disclosure of underlying values within the underlying compute data to the compute party.

20. A product including:
machine-readable media other than a transitory signal;
instructions stored on the machine-readable media, the instructions configured to, when executed, cause a machine to:
select underlying compute data for provision to a distributed ledger technology (DLT) based data construct;
encrypt the underlying compute data in accord with a homomorphic encryption scheme to generate homomorphic compute data with a homomorphic layer of encryption;
determine a compute party associated with the DLT-based data construct, the compute party selected to cause performance of one or more processing operations on the homomorphic compute data without concurrent decrypted access to the underlying compute data;
encrypt the homomorphic compute data with a public key associated with an originating party to generate secured homomorphic compute data by adding a secured layer of public key encryption above the homomorphic layer;
cause the secured homomorphic compute data to be added to a current block of the DLT-based data construct to effect a controlled share of the homomorphic compute data with the compute party, addition of the secured homomorphic compute data to the current block including:
generation of a previous hash of a previous block;
placement of the previous hash and the secured homomorphic compute data in the current block; and
addition of the current block to the DLT-based data construct; and
authorize access, by the compute party, to the homomorphic compute data to perform the one or more processing operations while the homomorphic compute data is still encrypted under the homomorphic layer of encryption by decrypting the secured homomorphic compute data to remove the secured layer.

* * * * *